US 6,516,461 B1

(12) United States Patent
Ichisugi

(10) Patent No.: US 6,516,461 B1
(45) Date of Patent: Feb. 4, 2003

(54) SOURCE CODE TRANSLATING METHOD, RECORDING MEDIUM CONTAINING SOURCE CODE TRANSLATOR PROGRAM, AND SOURCE CODE TRANSLATOR DEVICE

(75) Inventor: Yuuji Ichisugi, #113-403, 4-12-1, Azuma, Tsukuba-shi, Ibaraki 305-0031 (JP)

(73) Assignees: Secretary of Agency of Industrial Science & Technology, Tokyo (JP); Yuuji Ichisugi, Tsukuba (JP)

( * ) Notice: Subject to any disclaimer, the term of this patent is extended or adjusted under 35 U.S.C. 154(b) by 0 days.

(21) Appl. No.: 09/531,938

(22) Filed: Mar. 21, 2000

(30) Foreign Application Priority Data

Jan. 24, 2000 (JP) ........................................ 2000-015021

(51) Int. Cl.[7] ................................................. G06F 9/45
(52) U.S. Cl. ........................ 717/144; 717/142; 717/143; 717/137
(58) Field of Search ................................ 717/136, 137, 717/114, 141, 142, 143, 144, 154, 156, 131, 112, 140, 145, 146, 147, 152; 707/104.1, 101; 704/2, 9, 203

(56) References Cited

U.S. PATENT DOCUMENTS

| | | | |
|---|---|---|---|
| 5,586,020 A | * 12/1996 | Isozaki | 717/143 |
| 5,742,828 A | * 4/1998 | Canady et al. | 717/144 |
| 5,768,564 A | * 6/1998 | Andrews et al. | 717/137 |
| 6,031,993 A | * 2/2000 | Andrews et al. | 717/143 |
| 6,061,513 A | * 5/2000 | Scandura | 717/142 |
| 6,097,888 A | * 8/2000 | Simonyi | 717/144 |
| 6,138,272 A | * 10/2000 | Tonouchi | 717/142 |
| 6,314,562 B1 | * 11/2001 | Biggerstaff | 717/151 |
| 6,317,873 B1 | * 11/2001 | Townsend | 717/143 |

OTHER PUBLICATIONS

Title: Genoa: a customizable language☐ and front ☐ end independent code analyzer, ☐ ☐Author: Premkumar T. Devanbu, ACM, 1992.*
Title: Generating testing and analysis tools with Aria, Author: Devanbu et al, ACM, 1996.*
Title: IDL: sharing intermediate representations Author : Lamb et al, ACM, 1987.*
Poletto, Massimiliano, et al., 'C and tcc: A Language and Compiler for Dynamic Code Generation, ACM Transactions and Programming Languages and Systems, 21(2), Mar. 1999, pp. 324–369.

* cited by examiner

Primary Examiner—Tuan Q. Dam
Assistant Examiner—Chameli C. Das
(74) Attorney, Agent, or Firm—Workman, Nydegger & Seeley

(57) ABSTRACT

A source code translating method includes the steps of representing a particular source code in the form of an abstract syntax tree without using nodes representing expression statements, and converting such abstract syntax tree into a character string, wherein as the type of the root node in the abstract syntax tree being processed is if-statement (T71), a branch is taken to invoke the "procedure for producing if-statement" where a character string "if (" is first produced, and then, to produce "x==0" contained in the first occurrence of the subtree, the "procedure for outputting the abstract syntax tree as an expression" is recursively invoked, then a character string ")" is produced; to produce "y=0;" contained in the second occurrence of the subtree, the "procedure for outputting the abstract syntax tree as a statement" is recursively invoked, then a character string "else" is produced; and to produce "y=1;" contained in the third occurrence of the subtree (T72), the "procedure for outputting the abstract syntax tree as a statement" is recursively invoked, whereby a character string "if (x==0) y=0; else y=1;" is finally produced.

4 Claims, 13 Drawing Sheets

SOURCE CODE TRANSLATING METHOD, RECORDING MEDIUM CONTAINING SOURCE CODE TRANSLATOR PROGRAM, AND SOURCE CODE TRANSLATOR DEVICE

This application is based on Patent Application No. 2000-15021 filed Jan. 24, 2000 in Japan, the content of which is incorporated hereinto by reference.

BACKGROUND OF THE INVENTION

1. Field of the Invention

The present invention relates generally to a method of translating a source code, a recording medium for containing a source code translator program, and a source code translator device, and more particularly to such method, recording medium, and device as mentioned above that may be used in conjunction with a compiler, a preprocessor, an extensible programming language implementation, a source code parsing tool, a source code translating tool, and the like.

2. Description of the Prior Art (1) Definition of Terms

Before proceeding, the definitions for the terms that are used throughout the specification are provided, as follows:

Abstract Syntax Tree

The internal representation of a source code written in the Structured Programming Language. Representing a source code in the form of the abstract syntax tree makes it easier to parse and translate the source code than treating it as a character string.

Expression

In C, Java and like programming languages, the syntax defines constants, variables, operators, assignment expressions and the like as "expression". The left side and right side operands of a binary operator are also defined as "expression".

Statement

In C, Java and like programming languages, the syntax defines if-statement, while-statement, compound statement and the like as "statement".

Expression Statement

This is the term that is used in the specifications of C, Java and like programming languages. Any expression that contains semicolon ";" is called "expression statement". In the syntax, the expression statement is defined as one of the statements.

Separator

The separator or delimiter is a symbol that may be used with any expression to allow the expression to be treated as if it were a statement. In C, C++, Java and like programming languages, the semicolon ";" is used as a separator, for example.

Backquote Macro

In some programming languages, that enable the program itself to be operated within a given program, this is the construct that may be used to separate the program itself from that given program. In the Lisp programming language, for example, (+ x 1) is a program code that says "Add 1 to x". When this program code itself is to be described within a Lisp program, it may be described as (+ x 1). A value may be embedded directly inside a program code written in backquote. For example, in LISP, '(+ x 2, (+ y 1)) means a program code described as '(+ x 2), if y contains a value of 1.

Construct

Component which constructs a source code written in programming language. Variables, constants, operators, assignment expressions, if-statement, while-statement, and the like are called "construct", for example.

(2) Prior Art

Next, a source code translator program according to the prior art is discussed. Firstly, the following discussion covers the typical conventional source code translator program that is designed to process a source code written in C or like programming language.

By definition, the source code translator program is a program that accepts a source code written in a particular language as input, and performs certain conversion processing against the input source code to produce the corresponding output source code in any language that may be the same as or different from the original language. The source code translator program is also called "preprocessor". Generally, the source code translator program parses the construct of the input source code, and converts the source code into the internal representation that makes the subsequent translation process easier. In many cases, this internal representation has a tree structure, which is known as the "Abstract Syntax Tree".

In the prior art, when a source code containing any expression statements is represented as the abstract syntax tree, the abstract syntax tree may be described in a straightforward way by using nodes that represent the expression statements. Here, the expression statement refers to any expression that is followed by a semicolon ";", which is usually found in C, for example.

Now, the expression statement is discussed in a little more detail.

In the C language, and other languages, such as C++ and Java, that are similar in the syntax rules to C, the statement and the expression are distinguished from each other. For example, "x", "0", "x+1", and "x=0" are an expression, respectively, whereas if-statement and while-statement are statements. In C, any expression followed by ";" is usually treated as a statement. This may be called the expression statement. For example, "x=0;" is an expression statement, which is considered as a statement.

To provide a better understanding of the prior art, consider a specific case for a simple language where the syntax is defined by BNF (Backus-Naur Form), as shown below:

statement ::= if-statement | expression-statement
if-statement ::= "if" "("expression")" statement "else" statement
expression-statement ::= expression";"
expression ::= equality-comparison | assignment | variable | constant
equality comparison ::= expression "==" expression
assignment ::= expression "=" expression FIG. 1 depicts the abstract syntax tree that may be represented according to the prior art. FIG. 1 shows how the following program code written in the above simple language, if (x==0) y=0; else y=1;

may be represented as the abstract syntax tree by using the prior art.

FIGS. 2 through 6 show a recursive algorithm according to the prior art that converts an abstract syntax tree into an appropriate character string for output. Specifically, FIG. 2 is a flowchart showing the steps in a typical prior art procedure for translating the abstract syntax tree into a character string. FIG. 3 is a flowchart showing the steps in a typical prior art procedure for producing an if-statement as output. FIG. 4 is a flowchart showing the steps in a typical prior art procedure for producing an "expression statement" as output. FIG. 5 is a flowchart showing the steps in a typical prior art procedure for producing an "equality comparison" as output. FIG. 6 is a flowchart showing the steps in a typical prior art procedure for producing an "assignment" as output. Now, those procedures are described below as they are related to the abstract syntax tree shown in FIG. 1.

The process starts with invoking the "Procedure for Outputting an Abstract Syntax Tree" shown in FIG. 2. The abstract syntax tree being processed corresponds to the abstract syntax tree T11 in FIG. 1. The procedure in FIG. 2 takes a branch, depending on the type of the root node in the abstract syntax tree being processed. Since the root node in the abstract syntax tree T11 is if-statement, a branch occurs to invoke the "Procedure for Producing "if" Statement"(Step S21).

In the "Procedure for Producing "if" Statement" in FIG. 3, a string "if (" is first produced (Step S31). To output "x==0" contained in the first occurrence of the subtree, the "Procedure for Outputting an Abstract Syntax Tree" in FIG. 2 is recursively invoked (Step S32). Then, an output string of ")" is obtained (Step S33). Then, to output "y=0;" contained in the second occurrence of the subtree, the "Procedure for Outputting an Abstract Syntax Tree" in FIG. 2 is recursively invoked (Step S34). Then, an output string "else" is obtained (Step S35). Finally, to output "y=1;" contained in the third occurrence of the subtree, the "Procedure for Outputting an Abstract Syntax Tree" in FIG. 2 is recursively invoked (Step S36). Then, the procedure in FIG. 3 ends, returning to the step that invoked this procedure.

Specifically, the steps S32, S34 and S36 recursively invoking the procedure in FIG. 2 are described. In the following, the procedure for producing "y=1;" in Step S36 is used as an example, and is described in further details. (Note that the procedure for producing "x==0" in Step S32 and the procedure for producing "y=0;" in Step S34 are not described, as those procedures are recursively performed in the same manner as that in Step S36.) Step S36 recursively invokes the "Procedure for Outputting an Abstract Syntax Tree" in FIG. 2. Here, the abstract syntax tree being processed is named as "T12". Since the type of the root node in the abstract syntax tree being processed is an expression statement, a branch is taken, invoking the "Procedure for Producing an Expression Statement" (Step S22).

In the "Procedure for Producing an Expression Statement" in FIG. 4, to output "y=1" contained in the subtree, the "Procedure for Outputting an Abstract Syntax Tree" in FIG. 2 is recursively invoked (Step S41). Then, an output string ";" is provided (Step S42). Then, the procedure in FIG. 4 ends, returning to the step that invoked this procedure.

Now, the procedure for producing "y=1" in Step S41 where the "Procedure for Outputting an Abstract Syntax Tree" is recursively invoked is discussed in further details. Step S41 is provided for recursively invoking the "Procedure for Outputting an Abstract Syntax Tree" in FIG. 2. Here, the abstract syntax tree being processed is named as "T13". Since the type of the root node in the abstract syntax tree being processed is an assignment, a branch is taken, invoking the "Procedure for Producing an Assignment" (Step S24).

In the "Procedure for Producing an Assignment" in FIG. 6, to output "y" contained in the first occurrence of the subtree, the "Procedure for Outputting an Abstract Syntax Tree" in FIG. 2 is further recursively invoked (Step S61). Then, an output string "=" is produced (Step S62). Then, to output "1" contained in the second occurrence of the subtree, the "Procedure for Outputting an Abstract Syntax Tree" in FIG. 2 is recursively invoked (Step S63). Then, the procedure in FIG. 6 ends, returning to the step that invoked this procedure.

Next, the procedure for producing "y" in Step S61 where the "Procedure for Outputting an Abstract Syntax Tree" is recursively invoked is discussed in further details. Step S61 is provided for recursively invoking the "Procedure for Outputting an Abstract Syntax Tree" in FIG. 2. Here, the abstract syntax tree being processed is named as "T14". Since the type of the root node in the abstract syntax tree is a variable, a branch occurs, where a variable name "y" is produced (Step S25). Then, the procedure in FIG. 2 ends, returning to the step in FIG. 6 that invoked this procedure.

Then, the procedure for producing "1" in Step S63 where the "Procedure for Outputting an Abstract Syntax Tree" is recursively invoked is discussed in further details. Step S63 is provided for recursively invoking the "Procedure for Outputting an Abstract Syntax Tree" in FIG. 2. Here, the abstract syntax tree being processed is named as "T15". Since the type of the root node in the abstract syntax tree being processed is a constant, a branch occurs where a constant name "1" is produced (Step S25). Then, the procedure in FIG. 2 ends, returning to the step in FIG. 6 that invoked this procedure.

Through the recursively invoking steps performed as described above, the abstract syntax tree T11 of FIG. 1 is processed to provide a string "if (x==0) y=0; else y=1;".

By using the internal representation of the abstract syntax tree containing expression statements represented by nodes as has been described so far in connection with the prior art, there is a problem in that the processing by the source code translator program becomes complicated, and there is another problem in that the work of describing a backquote macro becomes complicated. Those two problems are discussed below more clearly.

The first problem of the prior art is first discussed. The source code translator program accepts a program code as input, parses the construct of the program code, and turns it into an internal representation in the form of an abstract syntax tree. Then, it performs the conversion processing for the abstract syntax tree, which is finally converted back to a character string that is provided as output. When programming the conversion processing for the abstract syntax tree, programmers must always be aware of the distinction between a statement and an expression. This raises another problem.

For example, suppose that programmers failed to make this distinction between the statement and expression, and have inadvertently built an abstract syntax tree in which an expression appeared in the place where a statement should have appeared. An example of such abstract syntax tree is illustrated in FIG. 7. (Note that this also shows the abstract syntax tree using the representation according to the present invention, which will be described later.) As shown, the second and third occurrences of the subtree where if-statement appears should have contained a statement, but the subtree representing an assignment, which is one type of the expression, actually appeared in the abstract syntax tree of FIG. 7. If this abstract syntax tree is output as a character string using the procedures in FIGS. 2 through 6 of the prior art, it would result in a wrong program in which a separator ";" is lacking, as shown below.

if (x==0) y=0 else y=1

Similarly, if an abstract syntax tree built by programmers should inadvertently contain a statement that appeared in the subtree of the expression statement, the resulting program would contain a double separator ";", as shown below.

if (x==0) y=0;; else y=1;;

In order to avoid that such erroneous programs be produced, the programmer who is responsible for writing a source code translator program must be aware of the distinction between the statement and expression when handling the abstract syntax tree. Thus, the work of writing such programs would become complicated.

Next, the second problem of the prior art is discussed. For example, the Lisp language provides the function called the "backquote macro" (Backquote macro is also known as quasiquote). Here, the backquote macro refers to the function that allows the program itself to be treated as data, and is required when operating on the program using the language for that program. The following is an example of how a program code may be described using the backquote macro in Lisp:

'(if condition ,exp1 ,exp2)

There are several existing systems in which this backquote macro function is additionally implemented on C language, but any of those systems has a common problem in that the description using the backquote function is not as easy as for the Lisp language. This is because, in Lisp, the individual items contained in the syntax are all expressions, which makes it easier to describe, whereas in C, the expression and statement must be separated distinctly, which makes it more difficult to describe. The following is another example of how a program code may be described using the backquote macro:

'[Statement] {if (condition) ,[Expression]exp1;else, [Expression]exp2;}

To ensure that the construct of the backquote macro is parsed accurately, it is required that a non-terminal sign (in this case, statement) at the time of start, and a non-terminal sign (in this case, expression) at the time when a value is embedded must be specified. It may be understood from the above that the programmer's task of describing a program code by using the backquote macro would become complicated, which would reduce the practical utility of the backquote macro.

SUMMARY OF THE INVENTION

In light of the problems of the prior art that are associated with the source code conversion processing as well as the source code description using the backquote macro, the present invention provides a method of translating a source code, wherein an abstract syntax tree may be described without using nodes representing expression statements, so that such abstract syntax tree may be converted into a character string as appropriate.

So the object of the present invention is to meet the following requirements, that is, (a) To eliminate the need of being aware of the distinction between the expression and statement when building an abstract syntax tree, and to thereby make it easier to implement a source code translator program; and (b) To simplify the construct of the backquote macro. For example, this includes ensuring that the equivalent of the program code described using the backquote macro in the Lisp language, as given below, '(if condition ,exp1 ,exp2)

can be written in C, as follows:

'{if (condition) ,exp1;else,exp2;}

Thus, programmers can write any program code more easily, without worrying about the need of distinguishing between the statement and expression, as it usually occurs in the prior art.

According to one aspect of the present invention, there is a method of translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to be determined, wherein so that an input source code represented as an abstract syntax tree without using nodes corresponding to separators representing expression statements may be produced as a corresponding output source code, the method comprises the steps of:

outputting the abstract syntax tree as a statement;

outputting the abstract syntax tree as an expression; and producing each corresponding construct, wherein said step of outputting the abstract syntax tree as a statement depends on the type of the root node in the abstract syntax tree being output, and includes the steps of:

if the root node is a node representing a statement, producing each corresponding construct according to the type of that statement; and if the root node is a node representing an expression, outputting the abstract syntax tree as an expression and then producing a separator representing an expression statement, wherein said step of outputting the abstract syntax. tree as an expression depends on the type of the root node in the abstract syntax tree, and includes the step of producing each corresponding construct according to the type of that expression.

According to another aspect of the present invention, there is a recording medium for containing a source code translator program for translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to determined, wherein so that an input source code represented as an abstract syntax tree without using nodes corresponding to separators representing expression statement may be produced as a corresponding output source code, the source code translator program comprises the steps of:

outputting the abstract syntax tree as a statement;

outputting the abstract syntax tree as an expression; and producing each corresponding construct, wherein said step of outputting the abstract syntax tree as a statement depends on the type of the root node in the abstract syntax tree being output, and includes the steps of:

if the root node is a node representing a statement producing each corresponding construct according to the type of that statement; and if the root node is a node representing an expression, outputting the abstract syntax tree as an expression and then producing a separator representing an expression statement, wherein said step of outputting the abstract syntax tree as an expression depends on the type of the root node in the abstract syntax tree, and includes the step of producing each corresponding construct according to the type of that expression.

According to a further aspect of the present invention, there is a source code translator device for translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to be determined, wherein so that an input source code represented as an abstract syntax tree without using nodes corresponding to separators representing expression statements may be produced as a corresponding output source code, the source code translator device comprises:

means for outputting the abstract syntax tree as a statement;

means for outputting the abstract syntax tree as an expression; and means for producing each corresponding construct, wherein said means for outputting the abstract syntax tree as a statement depends on the type of the root nodes in the abstract syntax tree being output, and, if the root node is a node representing a statement, produces each corresponding construct according to the type of that statement; and if the root node is a node representing an expression, outputs the abstract syntax tree as an expression and then produces a separator representing an expression statement, wherein said means for outputting the abstract syntax tree as an expression depends on the type of the root node in the abstract syntax tree, and produces each corresponding construct according to the type of that expression.

The source code translating method of the present invention is provided for solving the problems of the prior art that are encountered when the conversion processing occurs for a given source code, and when source code is described using the backquote macro. According to the method of the invention, any source code may be described in the form of an abstract syntax tree without using any node representing the expression statement, and such abstract syntax tree may then be converted into an appropriate output character string.

Therefore, the present invention provides the following advantages in that:

1. programmers can build an abstract syntax tree without having to be aware of the distinction between the expression and statement. This makes it easier to implement the source code translator program.
2. the syntax of the backquote macro can be simplified. For example, the equivalent of the following description using the backquote macro in the Lisp language, '(if condition ,exp1 ,exp2)

may be written in C, as follows:

'{if (condition) ,exp1;else,exp2;}

As programmers can now write any source code without having to worry about the distinction between the expression and statement, as opposed to the prior art, they can describe the source code more easily.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
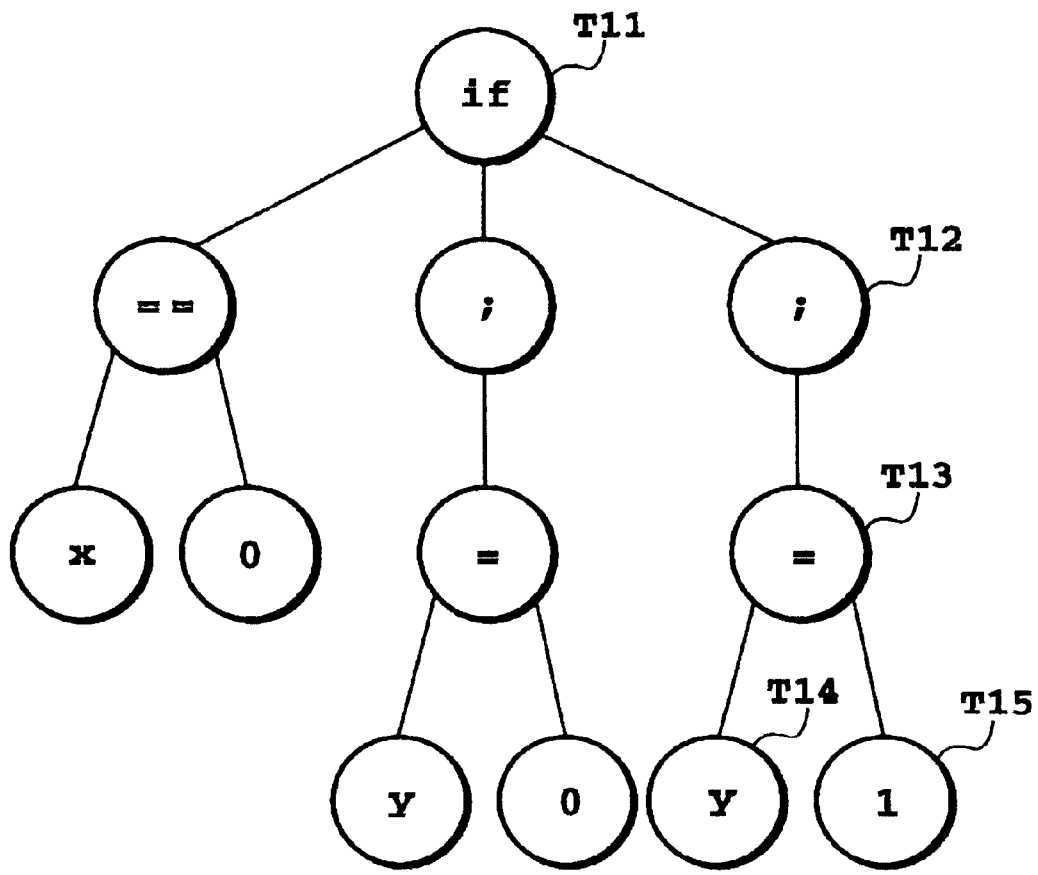
FIG. 1 illustrates the abstract syntax tree as represented in the prior art.
Figure 2:
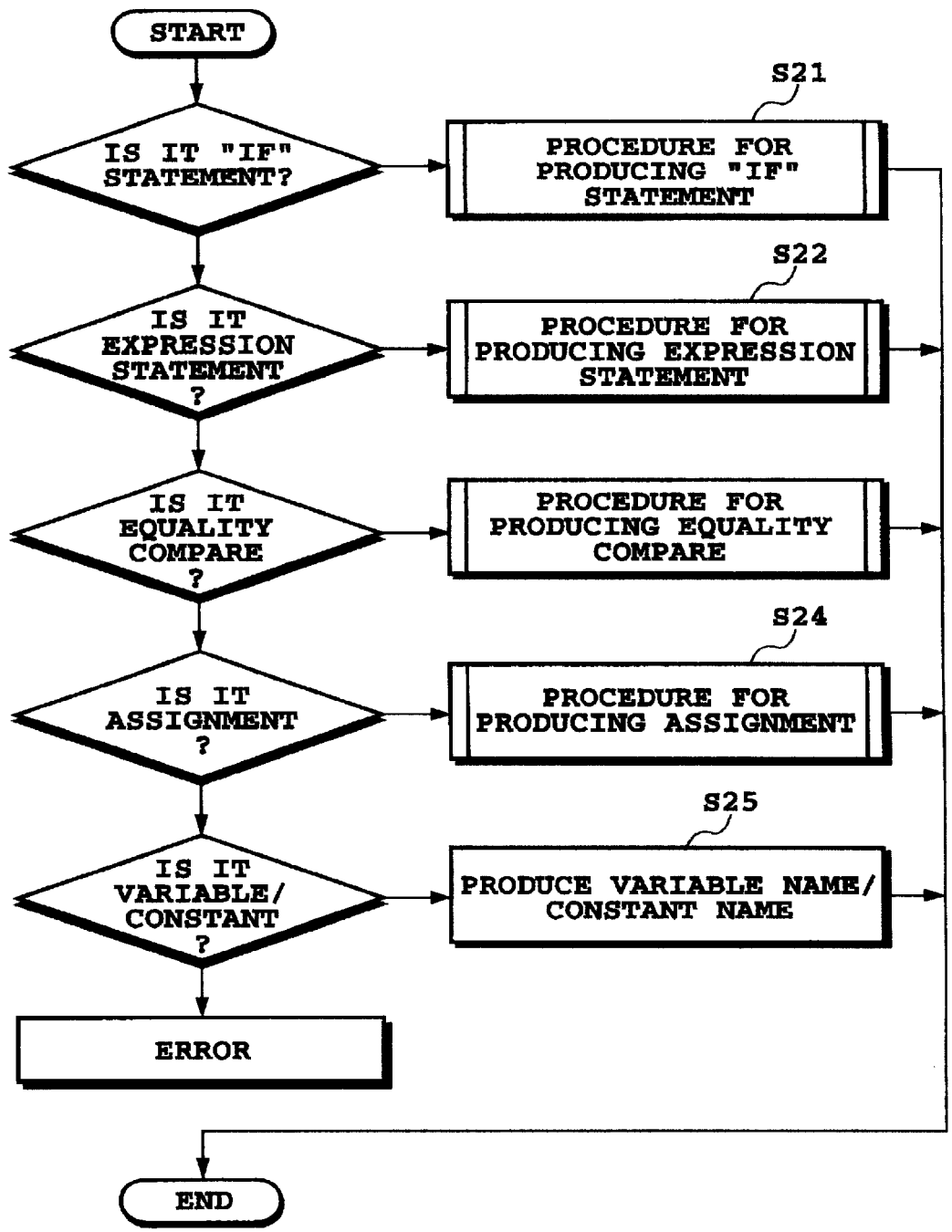
FIG. 2 is a flowchart depicting the steps in the procedure for converting the abstract syntax tree into a character string so that it is provided as output in accordance with the prior art.
Figure 3:
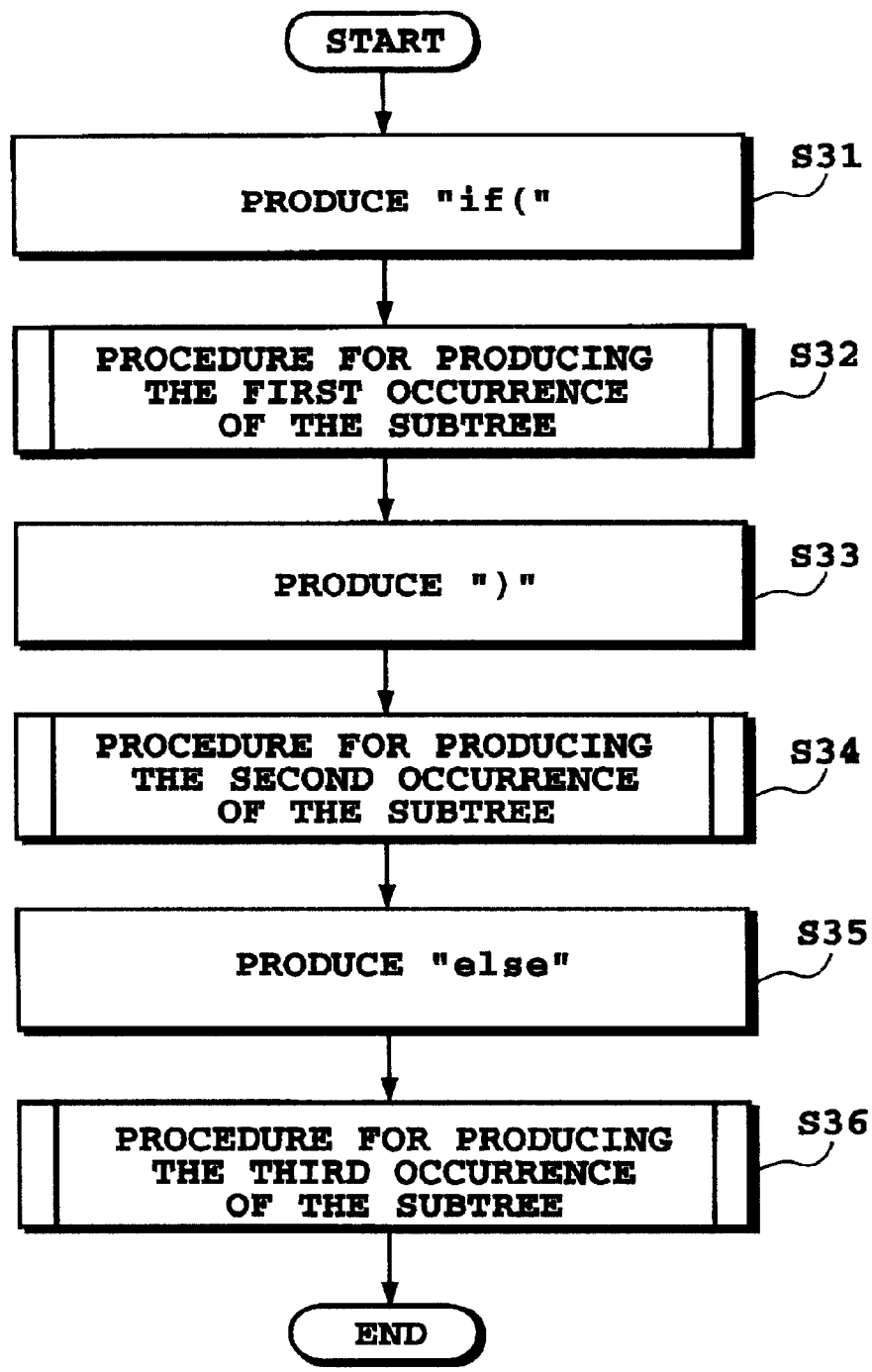
FIG. 3 is a flowchart depicting the steps in the procedure for producing if-statement in accordance with the prior art.
Figure 4:
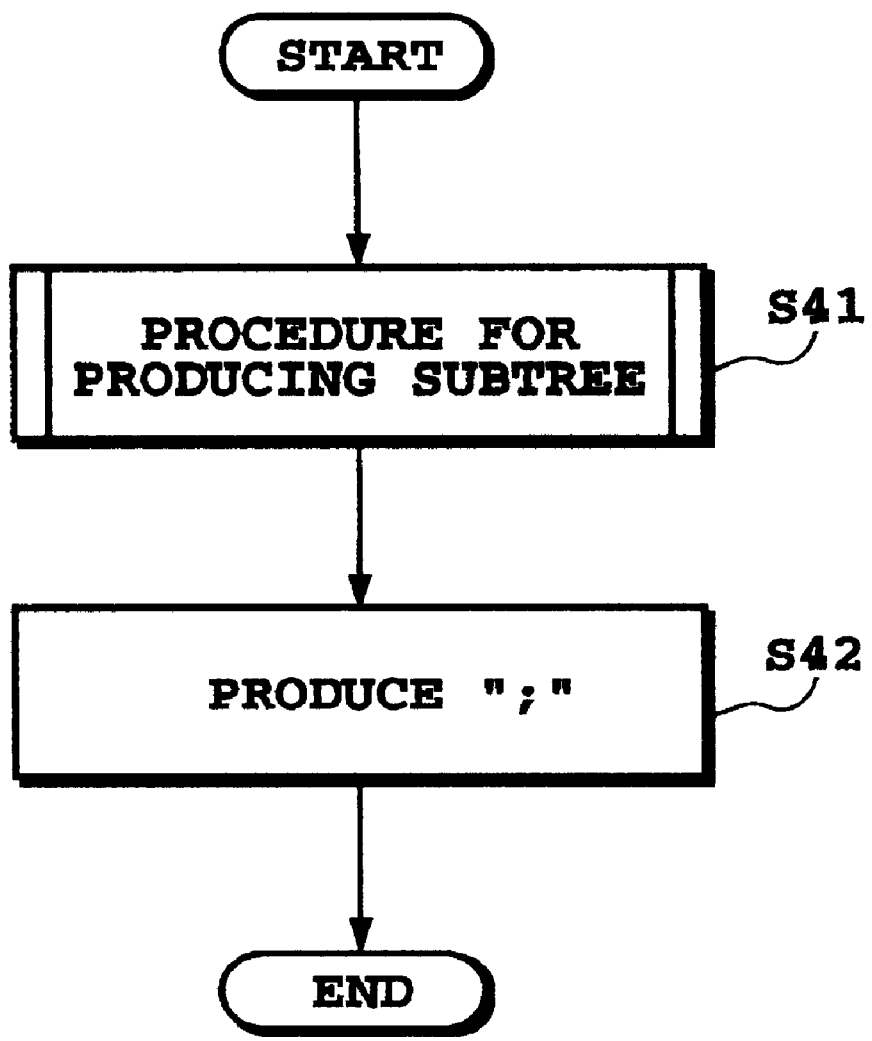
FIG. 4 is a flowchart depicting the steps in the procedure for producing an expression statement in accordance with the prior art.
Figure 5:
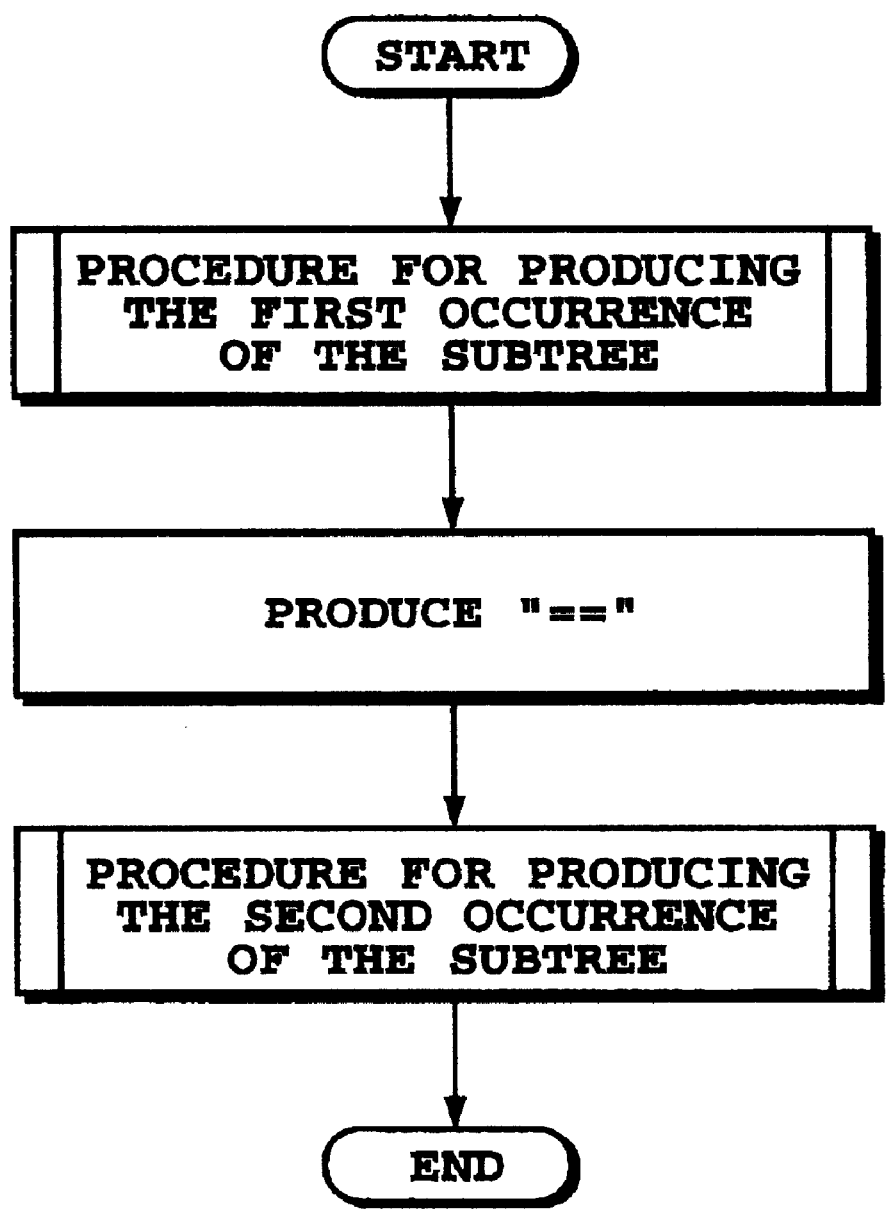
FIG. 5 is a flowchart depicting the steps in the procedure for producing an equality comparison in accordance with the prior art.
Figure 6:
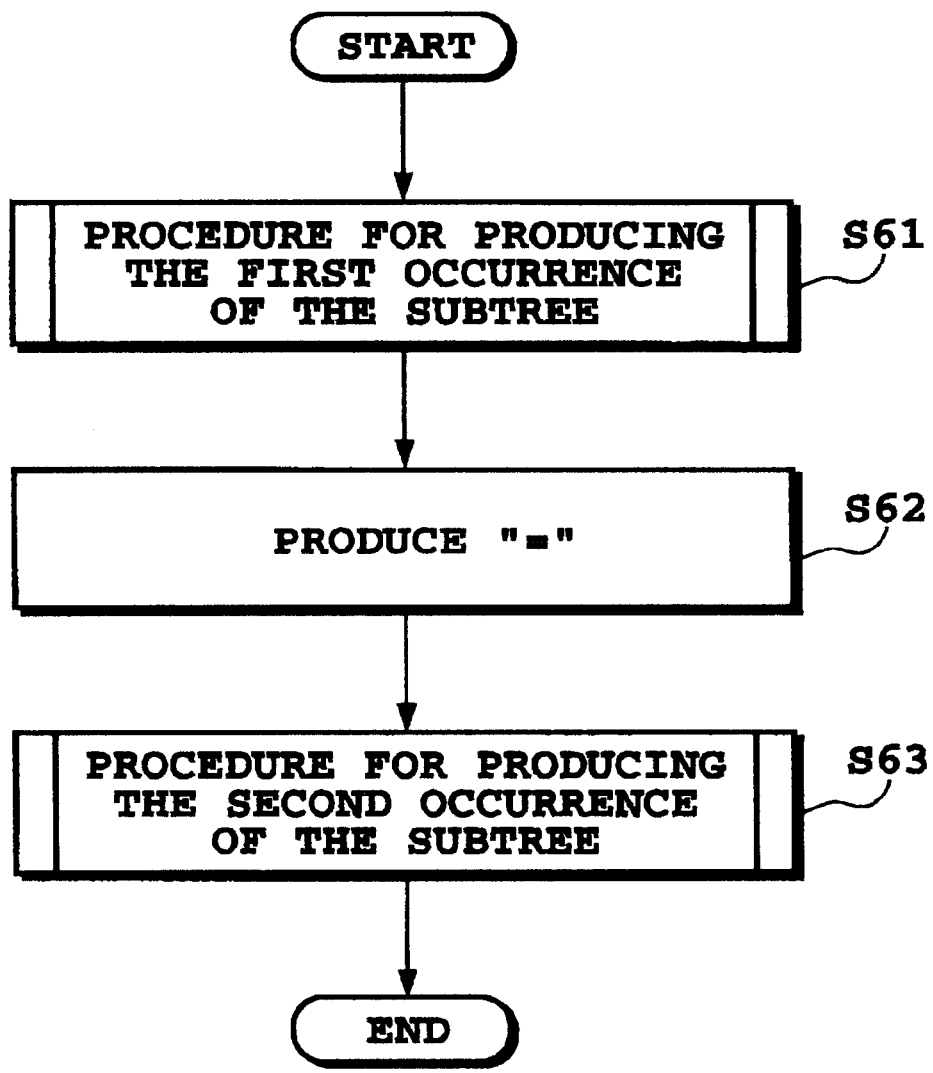
FIG. 6 is a flowchart depicting the steps in the procedure for producing an assignment in accordance with the prior art.

In the following description, it is assumed that the programming language to which the present invention may be applied meets the following requirements:

(i) According to the syntax rules, a statement and an expression are distinguished.

(ii) Any expression statement containing an expression followed by a separator is defined as a statement. (e.g., in the C language syntax, ";" is defined as a separator, and any expression statement containing an expression followed by ";" is defined as an statement.

(iii) For each construct, whether the construct is an expression or a statement is predefined. (e.g., in C, if-statement is always a statement, and 1+2 is always an expression. When a construct is given, this construct never depends upon its context, that is, it should be either an expression or a statement.)

(iv) For each construct, whether each of the components of the construct is an expression or a statement can be determined. (e.g., in C, if-statement includes three elements, such as a condition expression, "then" clause, and "else" clause. In this case, the condition expression should always be an expression, "then" clause and "else" clause should always be a statement.)

According to the present invention, any source code written in any programming language that provides the features listed above may be described without using nodes representing expression statements. When an expression statement is to be described, this may be done by using the abstract syntax tree itself that represents the expression contained in that expression statement.

In general, the abstract syntax tree that has been built without using the expression statement in accordance with the present invention may be produced as a character string, by using the algorithm that includes the procedures listed below:

(a) Ps: procedure for outputting the abstract syntax tree as a statement;
(b) Pe: procedure for outputting the abstract syntax tree as an expression; and
(c) Pi (i=0, 1, . . . ): procedure for producing each construct (if statement, assignment, equality comparison, . . . ).

Specifically, each of those procedures is described below.

The process starts with the procedure for outputting the abstract syntax tree as a statement, Ps, which takes a branch, depending on the type of the root node in the abstract syntax tree being processed. If the root node is a node representing a statement, then the procedure Ps invokes the procedure for producing a character string, Pi, depending upon the type of that statement. If the root node is a node representing an expression, then the procedure Ps first invokes the procedure for outputting the abstract syntax tree as an expression, Pe, and then produces a separator for representing an expression statement. When the procedure for outputting the abstract syntax tree as an expression, Pe is invoked, it takes a branch, depending upon the type of that expression, and then invokes the procedure for producing a character string, Pi.

When the procedure for outputting each construct, Pi(i=0, 1, . . . ), is invoked, for each of the component of the construct, if it is a statement, Pi recursively invokes Ps; if it is an expression, Pi recursively invokes Pe. Pi also outputs a character string if it is required to fill any space between the two adjacent components.

With invoking these procedures as described above, the abstract syntax tree will finally be output as the appropriate character string.

Figure 7:
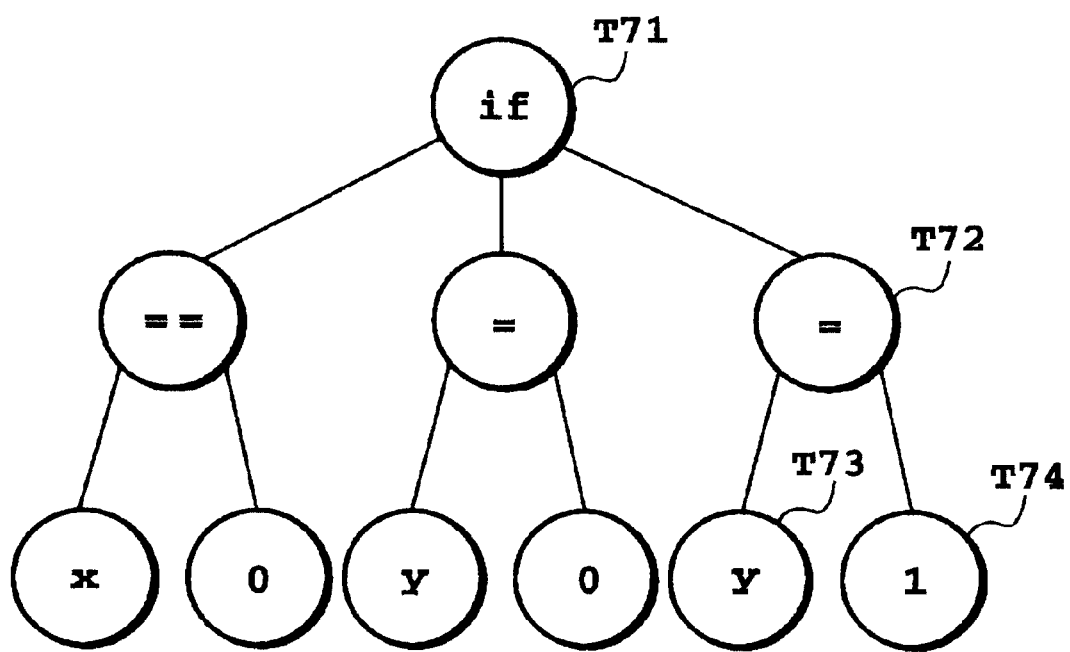
FIG. 7 illustrates the abstract syntax tree as represented according to the present invention.

Now, consider a specific case with a simple language where the syntax is defined by BNF, as follows:
statement ::= if-statement | expression-statement
if-statement ::= "if" "("expression")" statement "else" statement
expression-statement ::= expression";"
expression ::= equality-comparison | assignment | variable | constant
equality-comparison ::= expression "==" expression
assignment ::= expression "=" expression FIG. 7 illustrates how the following program code can be represented by the abstract syntax tree, using the present invention.

if (x==0) y=0; else y=1;

The present invention differs from the prior art shown in FIG. 1 in that the above program code may be represented as the abstract syntax tree without having to use any node that represents the expression statement. When an expression-statement "y=0;" is to be described, this may be done by using the abstract syntax tree itself that represents the expression "y=0". Note that the abstract syntax tree shown in FIG. 7 is a data structure that will be built by a syntax parser in the source code translator program that parses the construct of the input source code written as a character string.

Figure 8:
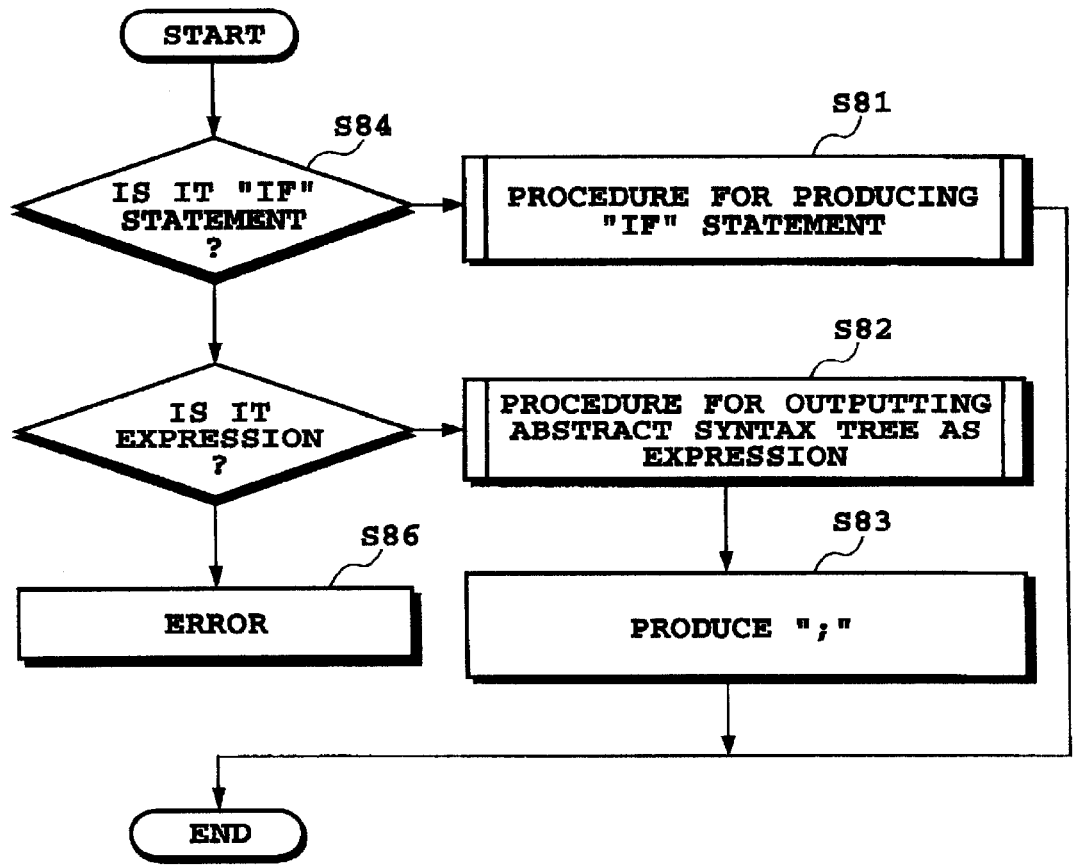
FIG. 8 is a flowchart depicting the steps in the procedure for producing the abstract syntax tree as a statement in accordance with the present invention.
Figure 9:
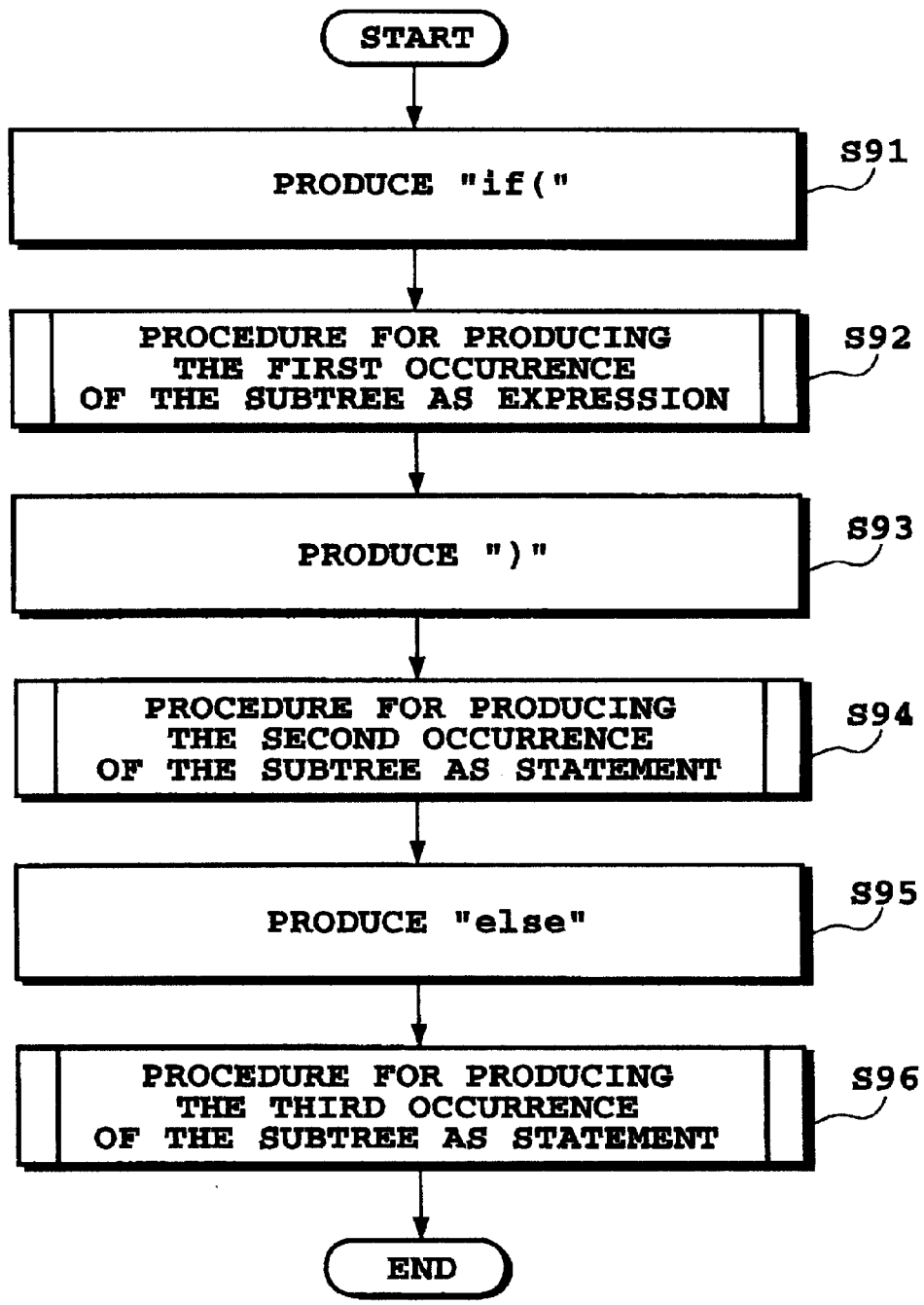
FIG. 9 is a flowchart depicting the steps the procedure for producing if-statement in accordance with the present invention.
Figure 10:
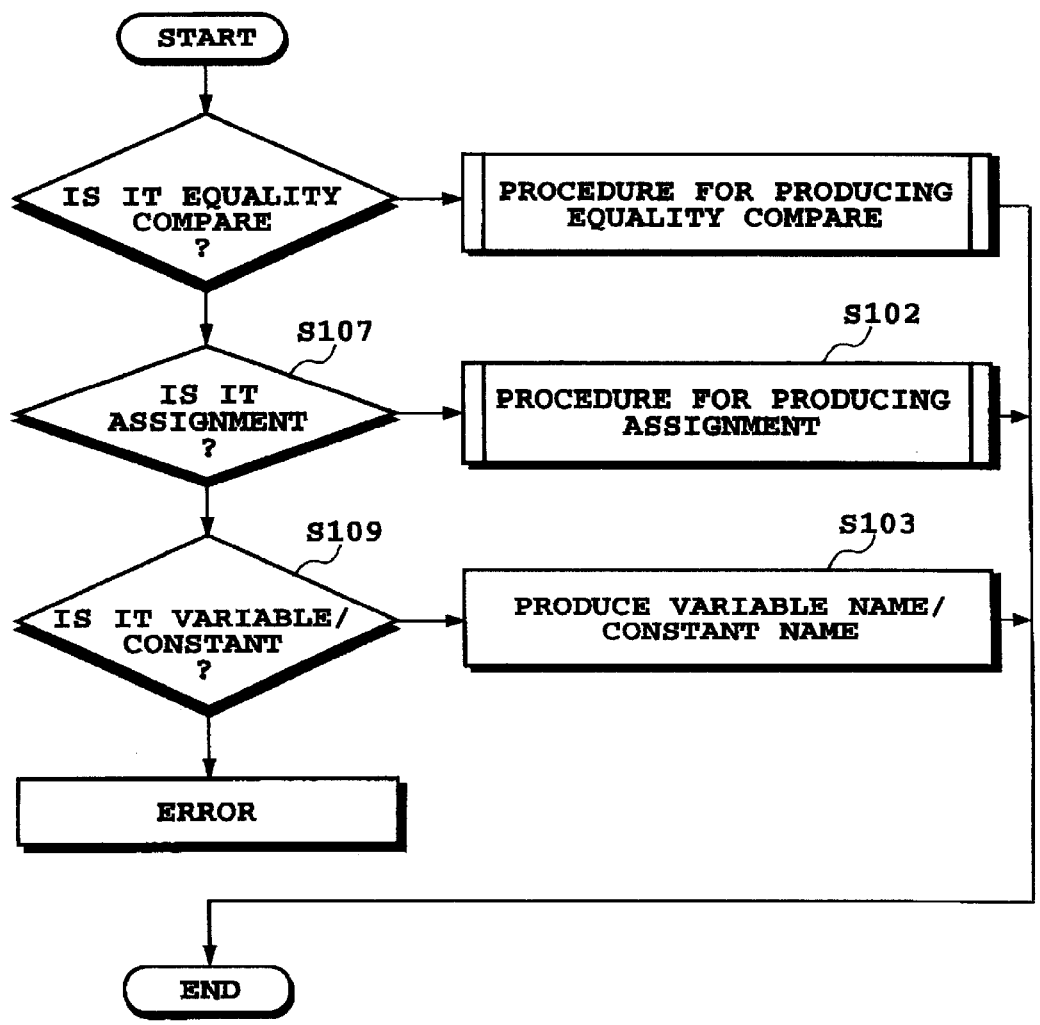
FIG. 10 is a flowchart depicting the steps in the procedure for outputting the abstract syntax tree as an expression in accordance with the present invention.
Figure 11:
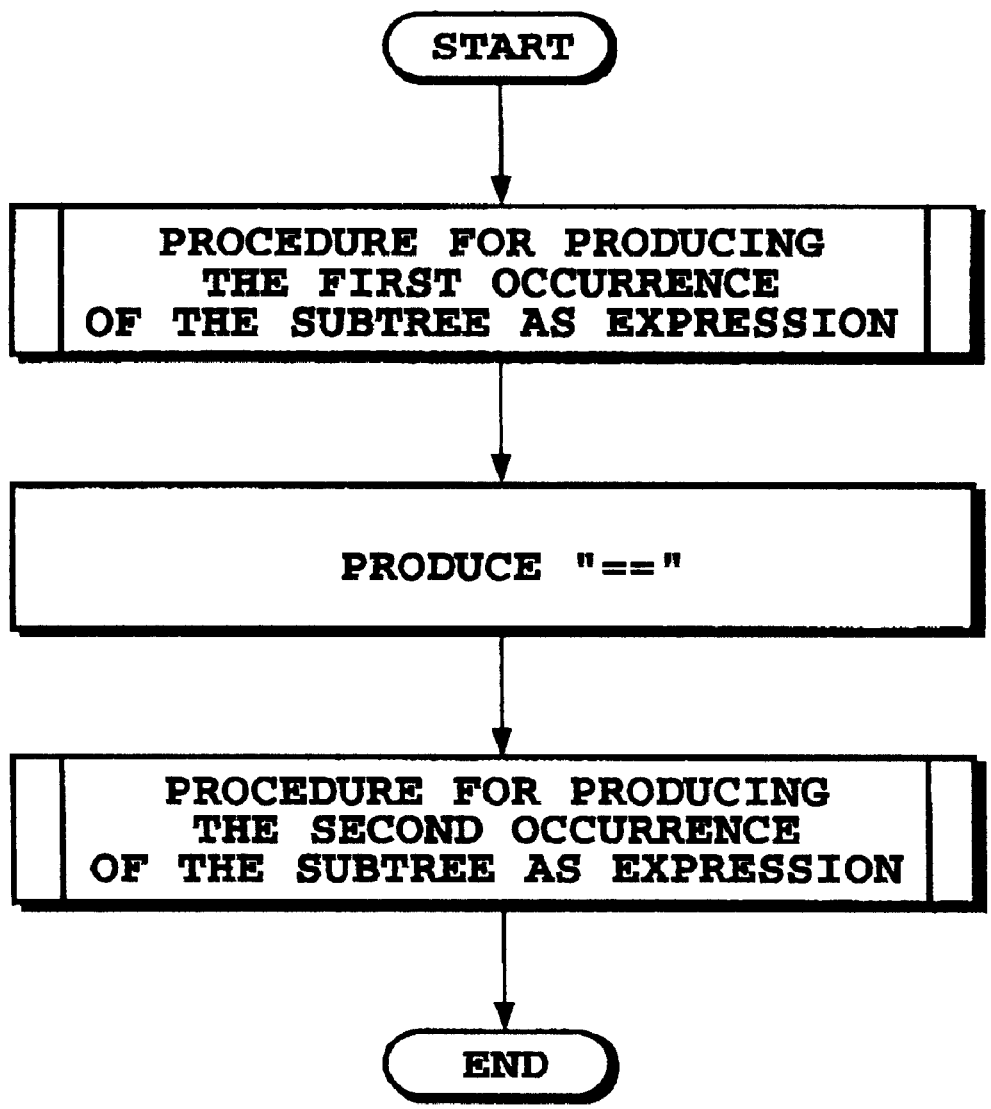
FIG. 11 is a flowchart depicting the steps in the procedure for producing an equality comparison in accordance with the present invention.
Figure 12:
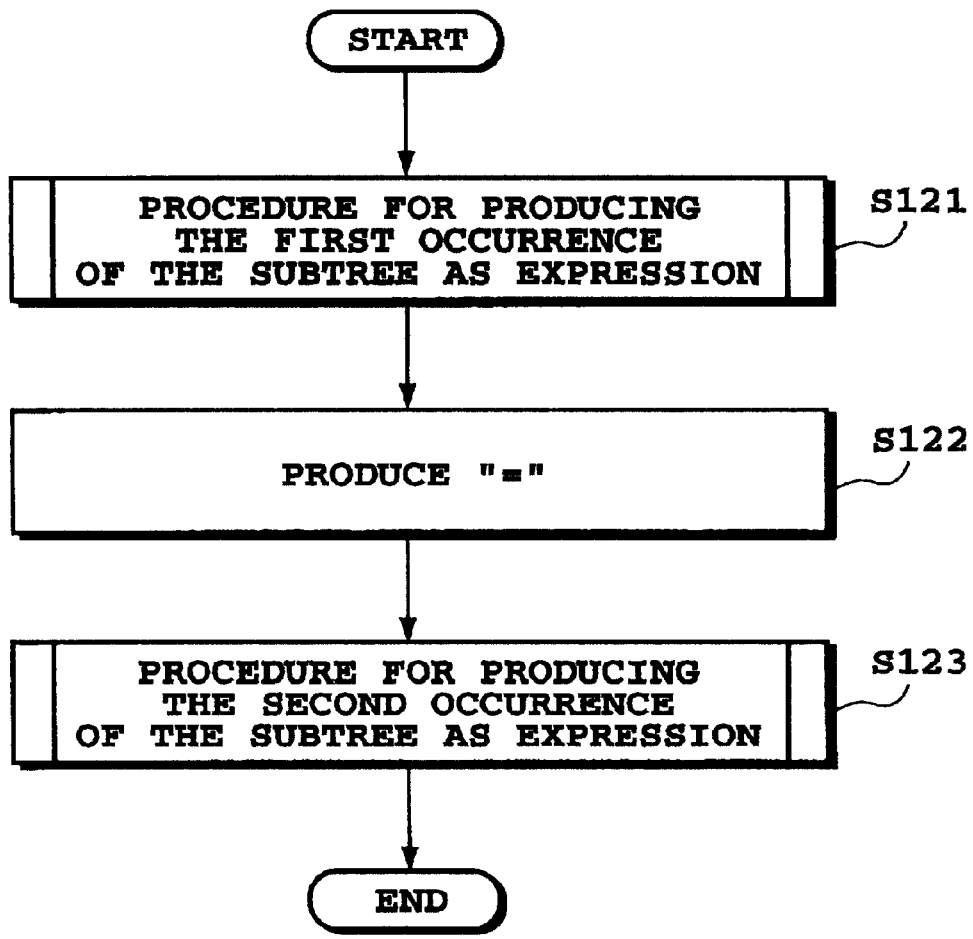
FIG. 12 is a flowchart depicting the steps in the procedure for producing an assignment in accordance with the present invention.

FIGS. 8 through 12 illustrate the recursive algorithm that translates this abstract syntax tree into a character string so that it can be provided as output. Specifically, FIG. 8 is a flowchart depicting the steps in the procedure for outputting the abstract syntax tree as a statement in accordance with the present invention. FIG. 9 is a flowchart depicting the steps in the procedure for producing if-statement in accordance with the present invention. FIG. 10 is a flowchart depicting the steps in the procedure for outputting the abstract syntax tree as an expression in accordance with the present invention. FIG. 11 is a flowchart depicting the steps in the procedure for producing an equality comparison in accordance with the present invention. FIG. 12 is a flowchart depicting the steps in the procedure for producing an assignment in accordance with the present invention. Now, those procedures are described below as they are related to the abstract syntax tree shown in FIG. 7.

The process starts with invoking the "procedure for outputting the abstract syntax tree as a statement" shown in FIG. 8. The abstract syntax tree being processed corresponds to the abstract syntax tree T71 in FIG. 7. The procedure in FIG. 8 takes a branch, depending on the type of the root node in the abstract syntax tree being processed. Since the type of the root node in the abstract syntax tree T71 is an if-statement (Step S84), the process take a branch, where the "procedure for producing if-statement" is invoked (Step S81). In the "procedure for producing if-statement" in FIG. 9, a string "if (" is first produced (Step S91), and to produce "x==0" contained in the first occurrence of the subtree, the "procedure for outputting the abstract syntax tree as an expression" in FIG. 10 is then recursively invoked (Step S92). Then, a string ")" is produced (Step S93); to produce "y=0;" contained in the second occurrence of the subtree, the "Procedure for outputting the abstract syntax tree as a statement" is then recursively invoked (Step S94). Then, a string "else" is produced (Step S95); and to produce "y=1;" contained in the third occurrence of the substree, the "procedure for outputting the abstract syntax tree as a statement" in FIG. 8 is finally recursively invoked (Step S96). Then, the procedure in FIG. 9 ends, returning to the step that invoked this procedure.

More specifically, the steps S92, S94, and S96, which recursively invoke the corresponding procedures, are described below. For sake of simplicity, however, the following description is limited to Step S96 where "y=1;" is produced (Note that, although the description of Step S92 where "x==0" is produced and Step S94 where "y=0;" is produced is omitted, those steps are recursively performed in the same manner as Step S96). Step 96 recursively invokes the "procedure for outputting the abstract syntax tree as a statement" in FIG. 8. Here, the abstract syntax tree being processed is named as T72. Since the type of the root node in the abstract syntax tree being processed is an assignment, which is one type of the expression, the procedure takes a branch, invoking the "procedure for outputting the abstract syntax tree as an expression" in FIG. 10, where a string "y=1" is produced (Step S82), and then a string ";" is produced (Step S83). Then, the procedure in FIG. 8 ends, returning to the step that invoked this procedure.

Next, Step S82 where "y=1" is produced is described in more details. Step S82 recursively invokes the "procedure for outputting the abstract syntax tree as an expression" in FIG. 10. Here, the abstract syntax tree being processed is named as T72. Since the type of the root node in the abstract syntax tree being processed is an assignment (Step S107), the procedure branches, where the "procedure for producing an assignment" is invoked (Step S102). In the "procedure for producing an assignment" in FIG. 12, to produce "y" contained in the first occurrence of the subtree, the "procedure for outputting the abstract syntax tree as an expression" in FIG. 10 is recursively invoked again (Step S121). Then, a string "=" is produced (Step S122), and to produce "1" contained in the second occurrence of the subtree, the "procedure for outputting the abstract syntax tree as an expression" in FIG. 10 is recursively invoked once more (Step S123). Then, the procedure in FIG. 12 ends, returning to the step that invoked this procedure.

Next, Step S121 where the "y" is produced is described in further details. Step S121 recursively invokes the "procedure for outputting the abstract syntax tree as an expression" in FIG. 10. Here, the abstract syntax tree being processed is named as T73. Since the type of the root node in the abstract syntax tree being processed is a variable (Step S109), the procedure branches, where a variable name "y" is produced (Step S103). Then, the procedure in FIG. 10 ends, returning to the step in FIG. 12 that invoked this procedure.

Next, Step S123 where the "1" is produced is described in further details. Step S123 recursively invokes the "procedure for outputting the abstract syntax tree as an expression" in FIG. 10. Here, the abstract syntax tree being processed is named as T74. Since the type of the root node in the abstract syntax tree being processed is a constant, the procedure branches, where a constant name "1" is produced (Step S103). Then, the procedure in FIG. 10 ends, returning to the step in FIG. 12 that invoked this procedure.

Note that if the type of the root node is unexpected, it generates an error that is processed accordingly(Step S86).

Through the steps performed as above, the abstract syntax tree T71 in FIG. 7 maybe output as a character string "if (x==0) y=0; else y=1;". Note that the above description is only provided as one example, and the present invention may also apply to any programming language whose construct rules allow for other statements such as "while" than "if", and other expressions such as arithmetic and other operations.

The method of translating source code according to the present invention may be implemented on any suitable recording medium on which the source code translator program is recorded.

Finally, possible applications of the present invention are presented.

Figure 13:
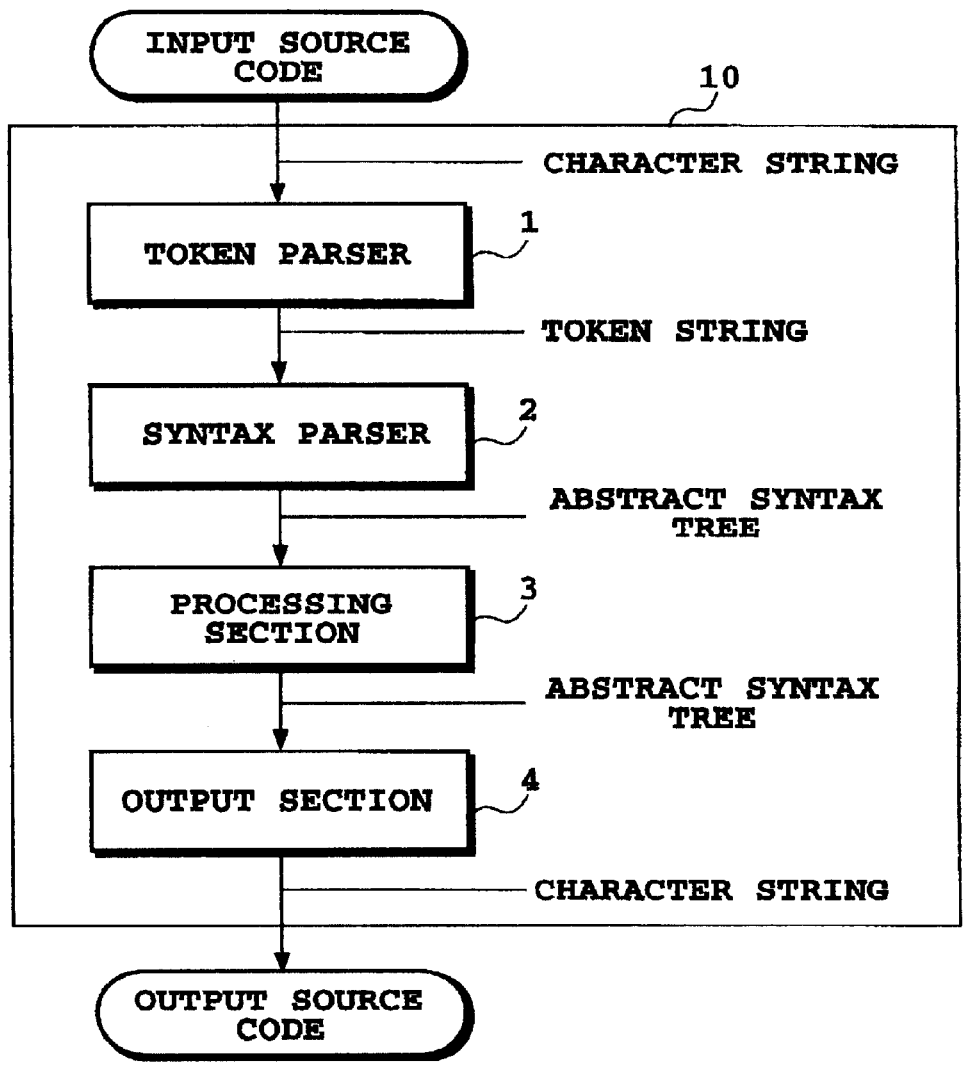
FIG. 13 is a block diagram illustrating the configuration of the preprocessor.

The present invention has been implemented as a preprocessor designed specifically for use in the Java programming language, which has been tested for its operation. FIG. 13 illustrates one example of the configuration of such preprocessor. This preprocessor accepts source code written in the Java language as input, and passes it through the translation or conversion stage where some conversion processing occurs. The output of the preprocessor is passed to another destination as the Java source code. The preprocessor has its internal structure that is essentially similar to the usual compiler.

More specifically, the source code input to the preprocessor (10) is passed through the token parser (1) and the syntax parser (2) where the construct of the input source code is parsed, and its construct is translated or converted from the character string into an abstract syntax tree. The abstract syntax tree is then passed through the PROCESSING section (3) where the translation or conversion processing takes place. The output of the PROCESSING section (3) is passed through the OUTPUT section (4) where the abstract syntax tree is translated or converted back into the character string that is provided as the output source code. The abstract syntax tree may be represented by using the method of the present invention, and the algorithm in the OUTPUT section (4) may be implemented by using the present invention.

It should be understood that the translation or conversion processing in the PROCESSING section (3) may include the optimization processing, document reduction processing, translation or conversion into a different programming language, and other various types of processing.

The present invention has been described in detail with respect to preferred embodiments, and it will now be more apparent from the foregoing to those skilled in the art that changes and modifications may be made without departing from the invention, therefore, in the apparent claims to cover all such changes and modifications as fall within the true spirit of the invention.

What is claimed is:

1. A method of translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to be determined, wherein so that an input source code represented as an abstract syntax tree without using nodes corresponding to separators representing expression statement may be produced as a corresponding output source code, the method comprises the steps of:

outputting the abstract syntax tree as a statement;

outputting the abstract syntax tree as an expression; and producing each corresponding construct, wherein said step of outputting the abstract syntax tree as a statement depends on the type of the root node in the abstract syntax tree being output, and includes the steps of:

if the root node is a node representing a statement, producing each corresponding construct according to the type of that statement; and if the root node is a node representing an expression, outputting the abstract syntax tree as an expression and then producing a separator representing an expression statement, wherein said step of outputting the abstract syntax tree as an expression depends on the type of the root node in the abstract syntax tree, and includes the step of producing each corresponding construct according to the type of that expression.

2. The method as defined in claim 1, wherein said step of producing each construct includes, for each of the components of the construct, if it is a statement, recursively invoking said step of outputting the abstract syntax tree as a statement;

if it is an expression, recursively invoking said step of outputting the abstract syntax tree as an expression; and producing a character string if it is required to fill any space between the two adjacent components, whereby each construct is produced as a character string.

3. A recording medium for containing a source code translator program for translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to be determined, wherein so that an input source code represented as an abstract syntax tree without using nodes corresponding to separators representing expression statements may be produced as a corresponding output source code, the source code translator program comprises the steps of:

outputting the abstract syntax tree as a statement;

outputting the abstract syntax tree as an expression; and producing each corresponding construct, wherein said step of outputting the abstract syntax tree as a statement depends on the type of the root node in the abstract syntax tree being output, and includes the steps of:

if the root node is a node representing a statement, producing each corresponding construct according to the type of that statement; and if the root node is a node representing an expression, outputting the abstract syntax tree as an expression and then producing a separator representing an expression statement, wherein said step of outputting the abstract syntax tree as an expression depends on the type of the root node in the abstract syntax tree, and includes the step of producing each corresponding construct according to the type of that expression.

4. A source code translator apparatus for translating an input source code described in a particular programming language that meets the following requirements, into a corresponding output source code in any language that may be the same as or different from the original language, the requirements being that:

a statement and an expression be distinguished according to the syntax rules;

any expression statement containing an expression followed by a separator be defined as one of the statements;

for each construct, whether it is an expression or a statement be predefined; and for each construct, whether each of the items comprising the construct is an expression or a statement be able to be determined, wherein so that an input source code represented as an abstract syntax tree without using nodes corresponding to separators representing expression statement may be produced as a corresponding output source code, the source code translator apparatus comprises:

means for outputting the abstract syntax tree as a statement;

means for outputting the abstract syntax tree as an expression; and means for producing each corresponding construct, wherein said means for outputting the abstract syntax tree as a statement depends on the type of the root node in the abstract syntax tree being output, and, if the root node is a node representing a statement, produces each corresponding construct according to the type of that statement; wherein if the root node is a node representing an expression, outputs the abstract syntax tree as an expression and then produces a separator representing an expression statement, and wherein said means for outputting the abstract syntax tree as an expression depends on the type of the root node in the abstract syntax tree, and produces each corresponding construct according to the type of that expression.

\* \* \* \* \*